United States Patent [19]
Muijs

[11] 3,794,046
[45] Feb. 26, 1974

[54] HEADER CROP DIVIDER FOR AN AXIAL FLOW COMBINE HAVING SIDE-BY-SIDE AXIAL FLOW UNITS

[75] Inventor: Cornelis Gerardus Muijs, Brugge, Belgium

[73] Assignee: Sperry Rand Corporation, New Holland, Pa.

[22] Filed: Aug. 27, 1971

[21] Appl. No.: 175,484

[52] U.S. Cl................ 130/27 T, 56/14.6, 198/217, 131/108, 146/163
[51] Int. Cl. .............................................. A01f 7/06
[58] Field of Search..... 56/14.6; 130/27 T; 131/108, 131/21 D, 66 R; 198/9, 217; 146/73, 164, 163

[56] References Cited
UNITED STATES PATENTS

| | | |
|---|---|---|
| 3,244,271 | 4/1966 | Wenning............................ 198/217 |
| 2,390,680 | 12/1945 | Ausherman........................ 198/217 |
| 2,865,416 | 12/1958 | Hetteen ............................... 146/164 |
| 3,525,344 | 8/1970 | Neuber .............................. 131/66 R |
| 3,616,800 | 11/1971 | Rowland-Hill et al. ........... 130/27 T |
| 3,294,133 | 12/1966 | Claas .................................... 56/14.6 |

Primary Examiner—Antonio F. Guida
Attorney, Agent, or Firm—Frank A. Seemar; John R. Flanagan; Joseph A. Brown

[57] ABSTRACT

An axial flow combine having side-by-side axial flow units in which cutting means are provided on the transverse consolidated auger of the header to cut the crop material to be fed to the side-by-side axial flow units into discrete streams, one stream of material for each of the side-by-side units.

4 Claims, 3 Drawing Figures

PATENTED FEB 26 1974

3,794,046

INVENTOR
CORNELIS G. MUIJS
BY
John C. Thompson
ATTORNEY

3,794,046

HEADER CROP DIVIDER FOR AN AXIAL FLOW COMBINE HAVING SIDE-BY-SIDE AXIAL FLOW UNITS

CROSS REFERENCE TO RELATED APPLICATIONS

This invention relates to axial flow units of the type shown on U.S. Application Ser. No. 252,120 which is a continuation of U.S. Application Ser. No. 790,145 filed Jan. 9, 1969, now abandoned, U.S. Pat. No. 3,626,472 and Canadian Patent 901,908. This application discloses an alternative species of those illustrated in U.S. Patent Application Ser. No. 175,522 filed Aug. 27, 1971 and entitled "Crop Feeding Means for an Axial Flow Combine Having Side-by-Side Threshing Units."

FIELD OF THE INVENTION

The present invention relates generally to the header of an axial flow type combine having side-by-side axial flow units, each of the units including a feeding section and threshing and separating sections. More particularly, this application relates to a header having means to divide the crop material, which is to be conveyed to the feeding sections of side-by-side axial flow units, into discrete streams, one for each of the side-by-side units.

BACKGROUND OF THE INVENTION

It has been found during test work of the combine shown in U. S. Pat. No. 3,626,472 that occasional feeding problems may occur. This is particularly true when working in heavy long stemmed green crops. In these conditions a thick and tangled mat of crop material is conveyed rearwardly by the crop elevator toward the side-by-side rotors. It is then necessary for the feeding means of each of the axial flow units to draw the material rearwardly past a transition member to tear the mat of entangled crop material apart. This tearing apart of the crop material by the feeding means consumes considerable horsepower, and may also lead to overloading one of the side-by-side units due to an uneven separation of the crop material. To improve the feeding characteristics in these tough straw conditions it has been proposed in Canadian Pat. 901,908 to provide the crop elevator with means to separate the straw mat into separate streams one for each of the side-by-side axial flow units, or to provide a beater between the crop elevator and the feeding means of the side-by-side axial flow units, the beater being provided with means to separate the straw mat into separate streams.

OBJECTS AND SUMMARY OF THE INVENTION

The object of this invention is to provide a crop header for an axial flow combine having side-by-side axial flow units, the header having means to separate the crop material into discrete streams, each of the discrete streams being fed to one of the side-by-side axial flow units. This object can be realized by providing the means in the form of knife sections mounted on the transverse consolidating auger header, the knife sections cooperating with a fixed knife section means supported below the transverse auger to sever and/or chop the crop material into discrete streams.

This and other objects and advantages of this invention will be apparent from the following description and claims taken in conjunction with the accompanying drawings which illustrate this invention.

DETAILED DESCRIPTION OF THE PREFERRED EMBODIMENT

Figure 1:
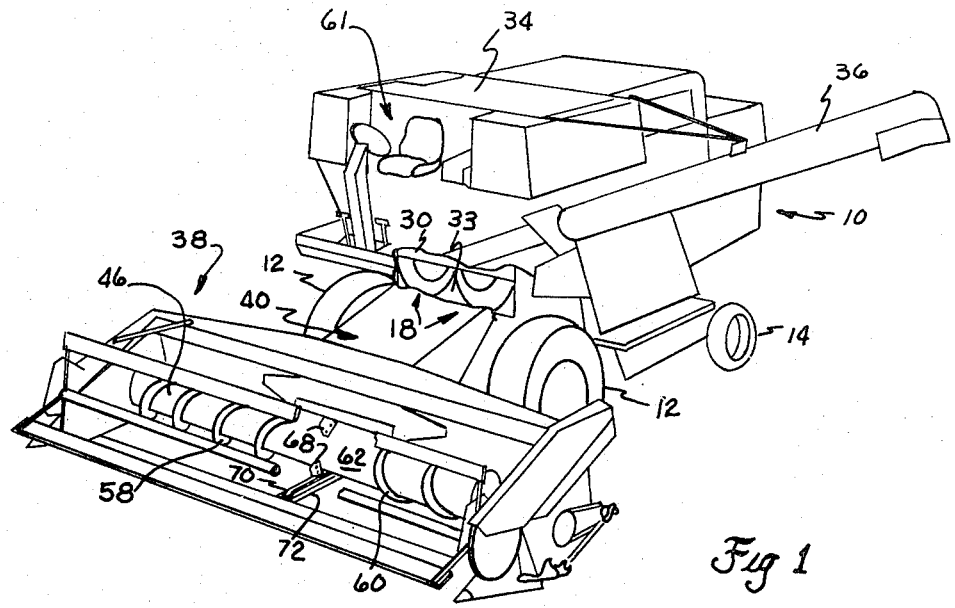
FIG. 1 is a perspective of the axial flow combine with the header of this invention and a crop elevator mounted on the front of a combine.

Referring first to FIG. 1 an axial flow combine of the type having multiple side-by-side axial flow units is represented generally at 10. In the following description right and left hand reference is determined from standing to the rear of the combine and facing the direction of travel. The combine 10, as is conventional, is provided with front and rear sets of wheels 12 and 14, respectively, which support the body of the combine for forward movement over the fields to be harvested. An operator's station 16 is mounted on the forward end of the combine. Disposed below the operator's station and between the front wheels 12 is the forward end of the axial flow units. The combine shown in FIG. 1 is shown having two axial flow units, indicated generally at 18, and while this is the preferred number of axial flow units, it should be appreciated that more than two units could be employed in side-by-side relationship. One form of the axial flow units is more completely illustrated in the aforementioned U.S. Application Ser. No. 879,214, and it should be observed that each axial flow unit 18 of this form includes a forward feeding means and rearward threshing and separating means (not shown). The feeding means may be in the form of an auger flight 24 mounted about a longitudinally extending tube whose forward end is rotatably mounted in a bearing assembly carried by a transverse frame member 30, the tube 26 extending rearwardly from the forward bearing assembly and also supporting the threshing and separating means which may be in the form of rasp bars and vanes (not shown) the rasp bars and vanes cooperating with a concave and grate (also not shown) to thresh and separate the crop from its straw. Disposed between the forward ends of the units is a transition member 33. In addition to the axial flow units, the combine is provided with conventional cleaning means, grain elevator, grain tank, and unloading auger, of which only the grain tank 34 and unloading auger 36 are shown.

Figure 2:
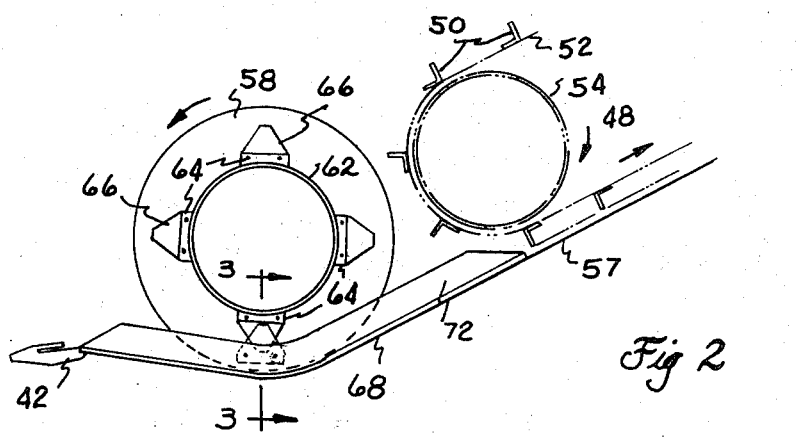
FIG. 2 is a sectional view of the header and crop elevator shown in FIG. 1.
Figure 3:
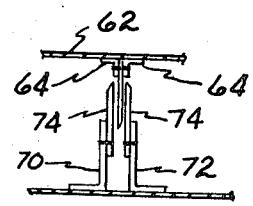
FIG. 3 is a sectional view taken along the line 3—3 in FIG. 2.

Mounted forwardly of the multiple side-by-side axial flow units 18 are crop conveying means which include a header, indicated generally at 38, and a crop elevator, indicated generally at 40. The header shown in FIGS. 1 to 3 is of the type referred to as a grain header and has a cutter bar 42 which is adapted to cut growing crop material, a reel 44 which is adapted to move the crop material over the cutter bar rearwardly to a transverse auger 46 which is adapted to consolidate the cut crop material and convey it towards the crop elevator. The crop elevator is conventionally provided with an undershot conveyor indicated generally at 48, the undershot conveyor including a plurality of cross slats 50 mounted on endless chain 52, the endless chain in turn being disposed over a front sprocket 54 and a rear sprocket (not shown). The undershot conveyor 48 is driven in a conventional manner and the cross slats on the lower run cooperate with the floor 57 of the crop conveyor 40 to move the crop material upwardly and rearwardly towards the feeding means of the axial flow units.

While only a grain header is shown in the drawings it should be appreciated that other forms of headers may be employed in the practice of this invention, such as, for example, a conventional corn header. In each of these forms of headers it is conventional to provide transverse auger 46, the transverse auger including flights 58 and 60 disposed about the right and left hand ends, respectively, of a central auger tube 62, and the flights acting upon rotation of the transverse auger to consolidate crop material towards the center of the auger tube and to feed the consolidated crop material upwardly and rearwardly toward the crop elevator 40. The cutter bar 42, reel 44, and transverse auger 46 are driven in a conventional manner not material to the present invention.

The header shown in FIGS. 1, 2 and 3 is provided with means to form the crop material to be conveyed to the multiple side-by-side axial flow unit into separate mats, one mat for each of the units, whereby a separate mat is received by each of the feeding means of the units. To this end the center of the auger tube 62 of the header is provided with a plurality of mounting brackets 64 secured to the auger tube 62 by welding or any other conventional manner. The mounting brackets 64 carry a plurality of outwardly extending knife sections 66 which may be in the form of conventional sickle knives. It should be noted that the knives 66 lie in a plane normal to the rotational axis of the auger tubes 62. Mounted on the floor 68 of the header 38 are right and left hand longitudinally extending channel members 70,72 which also support knife sections 74, the knife sections 74 being disposed below the transverse auger 46 and which are adapted to cooperate with the knives 66 to sever and/or chop the crop material into separate streams, one for each of the feeding means of the side-by-side axial flow units.

In this form of the invention the crop material to be harvested is initially cut by the cutter means 42 and conveyed rearwardly to the transverse auger 46 by the reel 44. The auger flights 58 and 60 consolidate the crop material centrally thereof, and finger means (not shown) in the auger convey the consolidated crop material rearwardly towards the crop elevator 40. It should be appreciated that if the severing means 64,66,70,72,74 were not provided that a single homogeneous mat of crop material would be conveyed upwardly and rearwardly towards the feeding means. However, by providing the knives 66 and 74 and channel members 70,72 any material which passes over the center of the floor of the header will be chopped and/or severed during rotation of the auger 48 therefore providing two separate streams of material which may be conveyed upwardly and rearwardly towards the feeding means.

What is claimed is:

1. An axial flow combine having
   side-by-side axial flow units, each of the axial flow units having forward feeding means and rearward threshing and separating means, said units being operable to progressively feed conveyed crop material towards the threshing and separating means, to thresh the fed crop material, and to separate the threshed crop from its straw,
   a crop elevator mounted adjacent the forward feeding means and adapted to convey crop material rearwardly towards the side-by-side axial flow units, and
   a header mounted adjacent the forward end of the crop elevator, the header having a rotatable transverse crop consolidating auger adapted to consolidate harvested crop material and move the material rearwardly towards the crop elevator, said auger including flights disposed about a central auger tube
   the combination therewith of
   means mounted on the central auger tube and extending radially outwardly therefrom and operable during rotation of the auger tube to form the harvested crop material into separate generally equally sized mats which can be conveyed rearwardly to the side-by-side axial flow units in separate mats, one mat for each of the units.

2. The combination set forth in claim 1 in which the means mounted on the central auger tube is knife means operable to sever the crop material to be conveyed to the crop elevator into separate mats.

3. The combination set forth in claim 2 in which said auger tube is provided with a plurality of knives disposed in a plane normal to the rotational axis of the transverse auger.

4. The combination set forth in claim 3 in which said plurality of knives cooperates with fixed knife means supported below the transverse auger.

* * * * *